United States Patent [19]

Spietschka et al.

[11] Patent Number: 4,758,664

[45] Date of Patent: Jul. 19, 1988

[54] PROCESS FOR THE PREPARATION OF LINEAR QUINACRIDONES

[75] Inventors: Ernst Spietschka, Idstein; Frank Prokschy, Frankfurt am Main, both of Fed. Rep. of Germany

[73] Assignee: Hoechst Aktiengesellschaft, Frankfurt am Main, Fed. Rep. of Germany

[21] Appl. No.: 858,434

[22] Filed: May 1, 1986

[30] Foreign Application Priority Data

May 3, 1985 [DE] Fed. Rep. of Germany ....... 3515875

[51] Int. Cl.$^4$ ............................................. C09B 48/00
[52] U.S. Cl. ....................... 546/49; 546/36; 546/41; 546/56; 546/57
[58] Field of Search ............. 546/49, 56, 57, 41, 546/36

[56] References Cited

U.S. PATENT DOCUMENTS

| | | | |
|---|---|---|---|
| 2,969,366 | 1/1961 | Griswold et al. | 546/49 |
| 3,007,930 | 11/1961 | Manger et al. | 546/49 |
| 3,009,916 | 11/1961 | Struve | 546/49 |
| 3,045,040 | 7/1962 | Deuschel | 560/48 |
| 4,258,190 | 3/1981 | Taggi | 546/103 |

FOREIGN PATENT DOCUMENTS

| | | | |
|---|---|---|---|
| 1150046 | 12/1963 | Fed. Rep. of Germany . | |
| 1184881 | 9/1965 | Fed. Rep. of Germany . | |
| 1196619 | 3/1966 | Fed. Rep. of Germany . | |
| 1268586 | 5/1968 | Fed. Rep. of Germany . | |
| 2165647 | 7/1972 | Fed. Rep. of Germany | 546/49 |
| 54-135821 | 10/1979 | Japan . | |
| 0166795 | 12/1964 | U.S.S.R. | 546/56 |

OTHER PUBLICATIONS

Labana et al., Chem. Reviews 67, 1-18 (1967).
Horiguchi, et al., Chemical Abstracts, vol. 72:13825j (1970).

Primary Examiner—Robert Gerstl
Assistant Examiner—Diana G. Rivers

[57] ABSTRACT

Process for the preparation of linear quinacridones of the formula (1)

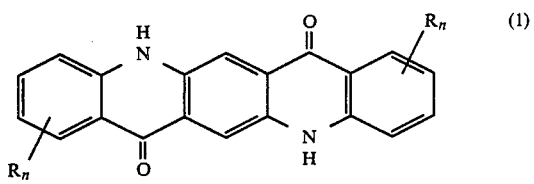

in which R denotes a hydrogen, fluorine, chlorine or bromine atom or a $C_1$-$C_6$-alkyl, $C_1$-$C_3$-alkoxy or phenyl group or a fused benzene ring or a phenylamino or phenoxy group which can be substituted on the aromatic nucleus by fluorine, chlorine or bromine atoms or $C_1$-$C_4$-alkyl groups, and n denotes a number from 0 to 2, it being possible, in the event that n≠0, for the substituents R present on the same benzene ring or on the two benzene rings to be identical or different, by the oxidation of linear 6,13-dihydroquinacridones of the formula (2)

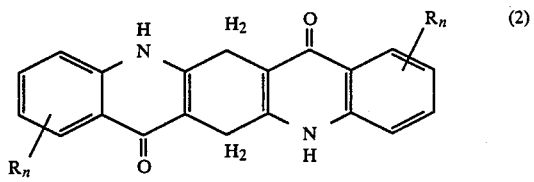

in which R and n have the meanings mentioned above, which comprises heating, at temperatures from about 180° C. to about 280° C., 1 mole of the last-mentioned compounds with 1 to 2 moles of iodine in a high-boiling organic solvent which is inert towards the reactants.

11 Claims, No Drawings

PROCESS FOR THE PREPARATION OF LINEAR QUINACRIDONES

The invention relates to a new process, which is advantageous compared with the state of the art, for the preparation of quinacridones by oxidizing 6,13-dihydroquinacridones with iodine in suitable organic solvents.

As is known, quinacridones (formula (D) in the reaction scheme shown later in the text) have acquired considerable economic importance in the series of polycyclic pigments because of their good fastness properties in the various fields of use. Amongst the various methods for their preparation (S. S. Labana and L. L. Labana, Chem. Rev. 67, 1 (1967)), two processes have proved technically suitable, both of which start from 3,6-dihydro-2,5-diarylaminoterephthalic acid esters (formula (A) in the reaction scheme) and differ from one another in principle in the sequence in which cyclization and oxidation are carried out:

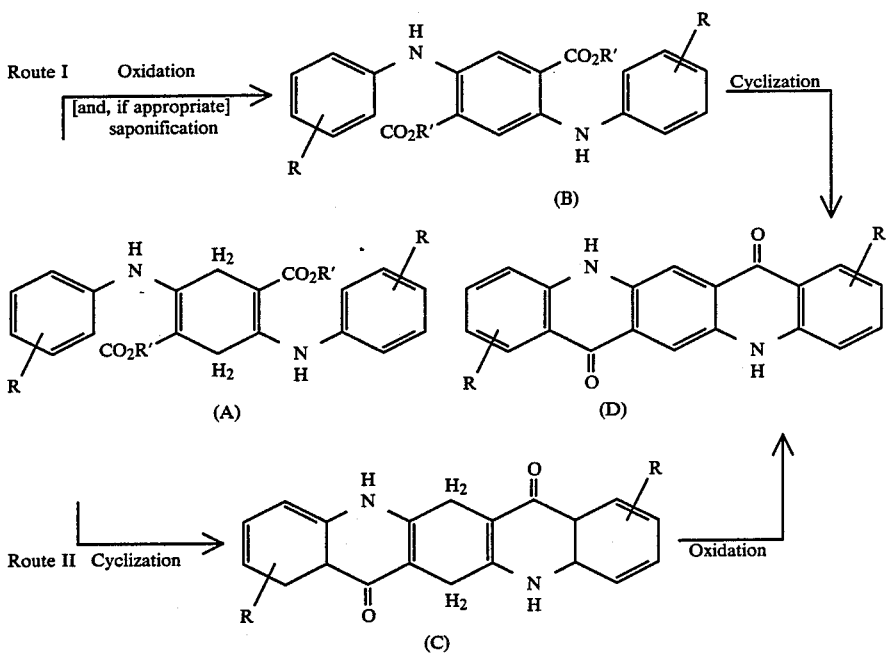

In Route I the 3,6-dihydro-2,5-diarylaminoterephthalic acid ester (Formula (A)) is first oxidized to give the 2,5-diarylaminoterephthalic acid ester (Formula (B)), if appropriate saponified to give the diacarboxylic acid ($R'=H$), and the ester or the carboxylic acid is then cyclized in polyphosphoric acid or in an acid polyphosphoric acid ester or in a high-boiling solvent in the presence of an acid or an acid chloride at an elevated temperature to give the quinacridone (Formula (D)).

In the known synthesis following Route II, the cyclization of (A) is first carried out in a high-boiling solvent to give the 6,13-dihydroquinacridone (C), and this is isolated in a known manner and subsequently oxidized to give the quinacridone (D).

The oxidizing agents used for this purpose are essentially atmospheric oxygen, sulfur, alkali metal polysulfides, quinones and aromatic nitro compounds, and these are in most cases employed in an aqueous alkaline medium, if appropriate with the addition of a water-soluble organic solvent. The system sodium m-nitrobenzenesulfonate/aqueous sodium hydroxide solution/alcohol is preferred.

The cyclization of (B) ($R'=H$) in polyphosphoric acid or an acid polyphosphoric acid ester and subsequent hydrolysis according to Route I affords directly a finely divided crude quinacridone which provides opacifying or transparent pigments of the commercially available $\beta$-modifications or $\gamma$-modifications, depending on the nature of the hydrolysis carried out and the aftertreatment (German Pat. Nos. 1,150,046, 1,184,881 and 1,196,619 and German Auslegeschrift No. 1,268,586). A disadvantage in this process is the relatively large amount of polyphosphoric acid, which cannot be recovered.

Although the solvent used in the cyclization to give (C) in the process according to Route II can be substanially recovered, the by-products formed in the oxidation leading to (D) pose ecological problems. Furthermore, with the oxidizing agents used, there is the risk of over-oxidation or only partial oxidation, which results in non-uniform products. Control resulting in the desired crystal modifications can be achievd by the nature of the oxidation and by appropriate additives when the highly crystalline crude quinacridones are ground (U.S. Pat. Nos. 2,969,366, 3,007,930, 3,009,916, 3,148,075, 3,475,436 and 3,632,588).

Both of the known processes (Route I and Route II) have the disadvantage that the intermediate compounds (B) and (C) in the route from (A) to (D) have to be isolated at an intermediate stage.

For economic and ecological reasons there was, therefore, a need for a process by means of which the quinacridones (D) are obtained directly from the corresponding 3,6-dihydro-2,5-diarylaminoterephthalic acid esters (A) without intermediate isolation, and also, in the case of the unsubstituted quinacridone ((D), $R=H$), the desired crystal modifications are obtained, and which has none of the disadvantages described earlier in the text.

It has now been found that linear quinacridones of the general formula (1)

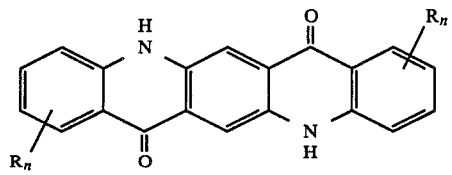 (1)

in which R denotes a hydrogen, fluorine, chlorine or bromine atom or a $C_1$–$C_6$-alkyl, $C_1$–$C_3$-alkoxy or aryl group, for example a phenyl group, or a fused benzene ring or a phenylamino or phenoxy group, which can be substituted on the aromatic nucleus by fluorine, chlorine or bromine atoms or $C_1$–$C_4$-alkyl groups, and n denotes a number from 0 to 2, it being possible, in the event that n≠0 for the substituents R present on the same benzene ring or on the two benzene rings to be identical or different, can be prepared advantageously as a result of the oxidation of linear 6,13-dihydroquinacridones of the general formula (2)

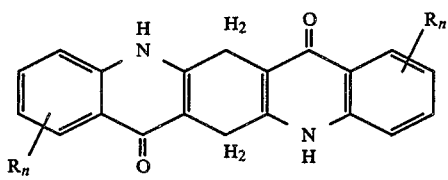 (2)

in which R and n have the meanings mentioned above, by heating the last-mentioned compounds with iodine in a high-boiling organic solvent at temperatures from about 180° C. to about 280° C.

It stands to reason that the organic solvents employed must be inert towards the reaction compounds, especially the iodine employed as the oxidizing agent. Examples of suitable solvents are nitrobenzene, biphenyl, diphenyl ether, N-methylpyrrolidone (NMP) and chloronaphthalene, but especially a mixture of 76.5% of diphenyl ether and 23.5% of biphenyl, a mixture which is known by the name ®Dowtherm A [U.S. Pat. No. 4,258,190].

The amounts of organic solvent and iodine which should preferably be used, relative to the starting compound, depend on the substituents R and the number thereof in the molecule of the starting compound of the formula (2). Thus it is sufficient for the oxidation of the unsubstituted 6,13-dihydroquinacridone to use the stoichiometric amount, that is to say 1 mole of iodine per mole of starting compound, whereas for the oxidation, for example, of the dichloro compound, a certain excess of iodine is used, it being expedient to use an amount of 1–2 moles, preferably 1.1–1.3 moles of iodine. The optimum amount of organic solvent to be used should, depending on the substituents R in the molecule of the starting compound, be such as to provide a readily stirrable reaction mixture (suspension). Chlorine-substituted or alkyl-substituted starting materials, for example, require more solvent than the unsubstituted starting material.

The hydrogen iodide formed in the reaction according to the invention

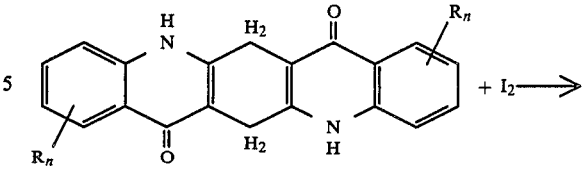

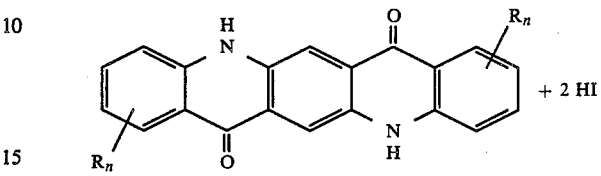

is distilled over during the reaction and is absorbed in dilute aqueous alkali metal hydroxide solution, for example sodium hydroxide solution. The iodine is then substantially recovered from the aqueous alkaline solution by adding a suitable oxidizing agent, for example hydrogen peroxide. If the oxidative recovery of the iodine from the aqueous alkaline solution of hydrogen iodide is carried out in the presence of one of the inert organic solvents suitable as the reaction medium, the iodine-containing organic solvent can be used again for a reaction batch after the water has been removed (drying) and the iodine concentration has been adjusted to the desired value.

The organic solvent obtained after the reaction has been carried out and the hydrogen iodide formed and the quinacridone obtained have been separated off, can be recovered by distillation in a known manner and can be employed again.

The following details should also be stated in regard to carrying out the process according to the invention:

Since the organic solvents mentioned earlier in the text as suitable boil within the range of reaction temperatures of about 180° C. to about 280° C., it is expedient to carry out the oxidation in a particular case at the boiling point of the organic solvent used (in this regard see the data in the tabular examples).

The duration of the reaction, i.e. the reaction time required to ensure quantitative oxidation, depends, of course, on the structure of the starting compound employed, i.e. on the substituent R in the molecule of the compound of the formula (2). The reaction times usually vary between 2 and 8 hours. Chlorine-substituted starting compounds, for example, require a longer oxidation time than unsubstituted starting compounds.

The oxidation according to the invention can expediently be carried out in accordance with two different variants. In the first variant (Method A), the 6,13-dihydroquinacridone of the said formula (2) is initially taken in the boiling solvent, and a solution of iodine in this solvent is added dropwise. In the case of the oxidation of the unsubstituted 6,13-dihydroquinacridone (α-crystal phase in ®Dowtherm A as solvent), this method affords unsubstituted quinacridone of the α-crystal phase. In the other variant (Method B), the required amount of iodine is added at a low temperature to the 6,13-dihydro-quinacridone (α-crystal phase, ®Dowtherm A as solvent) of the said formula (2), and the mixture is brought to the temperature necessary for the reaction. In the case of the unsubstituted starting material, this method affords the quinacridone in the β-crystal phase.

In regard to the definition of α-, β- and γ-crystal phases, including relevant X-ray diffraction diagrams for linear quinacridones, reference should be made to U.S. Pat. No. 2,969,366.

Japanese preliminary published specification No. 54-135,821 describes the use of a series of oxidizing agents for the oxidation of dihydroquinacridone to quinacridone; in this case the oxidizing agent, inter alia iodine, is employed in an aqueous alkaline medium in the presence of a water-soluble organic solvent, such as dimethyl sulfoxide, which means that in this case—in the event that iodine is used it is not iodine, but the hypoiodite ion which acts as the oxidizing agent. Compared with the process described in this reference, the process according to the invention has the benefit of the advantages that there is no risk of overoxidation and its harmful associated effects, the organic solvent employed can be recovered more easily and it is possible to control the process in regard to the crystal phase to be obtained, if the unsubstituted 6,13-dihydroquinacridone is oxidized. Whereas in the known process mentioned only the β-crystal phase of the linear quinacridone is obtained, in the process according to the invention the oxidation of the unsubstituted 6,13-dihydroquinacridone can be guided, by choosing the procedure and the organic solvent, towards the desired β-crystal or γ-crystal phase of the linear quinacridone, it being possible to convert these phases into the corresponding valuable pigments by known methods.

In the process according to the invention the linear quinacridones of the said formula (1) are obtained in a high state of purity and crystallinity and in a high yield. A particular advantage of the process according to the invention can be seen in the fact that the preparation of the quinacridones of the formula (1), starting from the 3,6-dihydro-2,5-diarylaminoterephthalic acid esters ((A) in the scheme of reactions/route II illustrated initially), can be carried out via the stage of the 6,13-dihydroquinacridone without the intermediate isolation of the last-mentioned compound, i.e. in a one-pot reaction. This reaction can be carried out by alternative procedures, either by cooling after cyclization has been carried out and heating again after iodine has been added (Method B) or by adding a solution of iodine in the same organic solvent dropwise to the still boiling suspension of the resulting 6,13-dihydroquinacridone (Method A).

Methods A and B are described below in conjunction with Tabular Examples 1–31:

Method A

A solution of b parts of iodine in d parts of solvent is added dropwise, at the boil and in the course of 30–90 minutes to a parts of 6,13-dihydroquinacridone of the formula (2) in c parts of the same solvent, and the reaction mixture is then kept at temperature T for a further x hours. After approx. 20% of the solvent has been removed by distillation under reduced pressure the residue is filtered off with suction, washed with ethanol and methylene dichloride and dried.

Method B a parts of 6,13-dihydroquinacridone of the formula (2) and b parts of iodine in c parts of solvent are kept at temperature T for x hours. Working up is carried out as in Method A.

If a fairly large amount of iodine is used, it is advisable to subject the resulting products also to an after-treatment with alkaline sodium thiosulfate solution.

In the tabular examples below numerical values are given for each of the parameters a, b, c, d, x and T, and the structure of the 6,13-dihydroquinacridone employed and of the quinacridone obtained in each case is indicated by giving the definition of R in the starting material and the end product. The yields achieved and, where applicable, the crystal phases obtained are also indicated.

| Example | R | Method | a | c | b | d | Solvent (B.P. °C.) | x | T °C. | Y % | Phase |
|---|---|---|---|---|---|---|---|---|---|---|---|
| 1 | H | B | 6.3 | 100 | 5.0 | | Dowtherm A (248° C.) | 4 | Heated under reflux | 98 | β |
| 2 | H | A | 12.6 | 100 | 10 | 100 | " | 1.5 | Heated under reflux | 93 | γ |
| 3 | H | B | 12.6 | 200 | 11.2 | | NMP (202° C.) | 5 | Heated under reflux | 92 | γ |
| 4 | H | A | 6.3 | 50 | 5.1 | 45 | Nitrobenzene (211° C.) | 2.5 | Heated under reflux | 87 | β |
| 5 | H | B | 6.3 | 110 | 5.1 | | Dowtherm A NMP = 9/1 | 4 | Heated under reflux | 94 | γ |
| 6 | H | B | 6.3 | 100 | 5.1 | | Biphenyl (256° C.) | 4 | Heated under reflux | 86 | β |
| 7 | H | B | 6.3 | 100 | 5.1 | | Biphenylether (252° C.) | 4 | Heated under reflux | 87 | γ |
| 8 | H | A | 12.6 | 100 | 11.6 | 150 | 1-Chloronaphthalane (263° C.) | 4 | Heated under reflux | 92 | γ |
| 9 | H | B | 12.6 | 200 | 10.6 | | 1-Chloronaphthalane | 4 | Heated under reflux | 95 | γ |
| 10 | H(*) | A | 6.3 | 80 | 5.2 | 63 | Dowtherm A (248° C.) | 4.5 | Heated under reflux | 98 | γ |
| 11 | H(*) | B | 6.3 | 150 | 5.2 | | " | 4 | Heated under reflux | 99 | γ |
| 12 | 2,9-CH$_3$ | B | 13.8 | 150 | 11 | | " | 3 | Heated under | 93 | |

-continued

| Example | R | Method | a | c | b | d | Solvent (B.P. °C.) | x | T °C. | Y % | Phase |
|---|---|---|---|---|---|---|---|---|---|---|---|
| 13 | 4,11-CH$_3$ | A | 13.6 | 50 | 10.2 | 91 | " | 2 | Heated under reflux | 92 | |
| 14 | " | B | 13.8 | 150 | 11 | | " | 4 | Heated under reflux | 93 | |
| 15 | 2,4,9,11-CH$_3$ | A | 14.8 | 250 | 10.2 | 91 | " | 2 | Heated under reflux | 99 | |
| 16 | " | B | 20.6 | 400 | 23.5 | | " | 4.5 | Heated under reflux | 99 | |
| 17 | 4,11-C$_2$H$_5$ | B | 14.8 | 150 | 10.2 | | " | 4 | Heated under reflux | 91 | |
| 18 | 4,11-iC$_3$H$_7$ | B | 15.9 | 180 | 10.3 | | " | 4 | Heated under reflux | 83 | |
| 19 | 2,9-tC$_4$H$_9$ | B | 9.5 | 110 | 6.2 | | " | 3 | Heated under reflux | 87 | |
| 20 | 2,9-Cl | B | 10.2 | 200 | 8.4 | | " | 4 | Heated under reflux | 86 | |
| 21 | 4,11-Cl | A | 15.3 | 150 | 12.7 | 154 | " | 5 | Heated under reflux | 96 | |
| 22 | " | B | 10.8 | 120 | 7 | | " | 3 | Heated under reflux | 93 | |
| 23 | 2,4,9,11-Cl | B | 13.6 | 150 | 8 | | " | 3 | Heated under reflux | 80 | |
| 24 | 2,9-F | B | 14 | 200 | 10.2 | | " | 4 | Heated under reflux | 93 | |
| 25 | 4,11-Br | B | 12.8 | 180 | 8.4 | | " | 4 | Heated under reflux | 95 | |
| 26 | 2,9-Br | B | 14.2 | 200 | 10.0 | | " | 4 | Heated under reflux | 81 | |
| 27 | 2,9-OCH$_3$ | B | 15 | 150 | 10.2 | | " | 3 | Heated under reflux | 96 | |
| 28 | 2,9-O—C$_6$H$_5$ | B | 10 | 100 | 5.2 | | " | 3 | Heated under reflux | 99 | |
| 29 | 2,9-NH—C$_6$H$_5$ | A | 19.9 | 200 | 12.7 | 154 | " | 4 | Heated under reflux | 97 | |
| 30 | " | B | 10 | 100 | 5.2 | | " | 3 | Heated under reflux | 92 | |
| 31 | 2,9-C$_6$H$_5$ | A | 13.5 | 100 | 8.0 | 97 | " | 4 | Heated under reflux | 94 | |

(*)The unsubstituted dihydroquinacridone employed was in the β-crystal phase, otherwise (examples 1-9) it was in the α-crystal phase Examples of the method used for carrying out the process according to the invention starting from 3,6-dihydro-2,5-diarylaminoterephthalic acid alkyl esters ((A) in the scheme of reactions mentioned initially) without intermediate isolation of the 6,13-dihydroquinacridone first formed ((C) in the scheme of reactions mentioned initially) (one-pot reaction), which is used as the starting compound in the oxidation reaction according to the invention:

a. A suspension of 37.8 parts of dimethyl 3,6-dihydro-2,5-dianilinoterephthalate in 200 parts of ®Dowtherm A is added dropwise to 150 parts of boiling ®Dowtherm A. The mixture is then kept at the boil for a further 90 minutes. Approx. 100 parts of the solvent are then distilled off and 254 parts of a 10% strength solution of iodine in ®Dowtherm A are then added dropwise. Working up is effected as described earlier in the text under "Method A". 27.7 parts of quinacridone in the γ-crystal phase are obtained, which corresponds to a yield of 89% of theory (relative to dimethyl 3,6-dihydro-2,5-dianilinoterephthalate).

(b.1) A suspension of 37.8 parts of dimethyl 3,6-dihydro-2,5-dianilinoterephthalate in 200 parts of ®Dowtherm A is added dropwise to 150 parts of boiling ®Dowtherm A. The mixture is then kept at the boil for a further 90 minutes. After approx. 100 parts of the solvent have been distilled off, the mixture is cooled to approx. 140° C., after which 25.4 parts of iodine are added and the mixture is kept at the boil for a further 4 hours. Working up is effected as described earlier in the text under "Method A". 27.8 parts of quinacridone in the β-crystal phase are obtained, which corresponds to a yield of 89% of theory (relative to dimethyl 3,6-dihydro-2,5-dianilinoterephthalate).

(b.2) If the procedure followed is as described above under example b 1), but with the difference that 40.6 parts of dimethyl 3,6-dihydro-2,5-di-(p-methylanilino)-terephthalate are used as the starting material, 32.2 parts of 2,9-dimethylquinacridone are obtained, which corresponds to a yield of 95% of theory (relative to dimethyl 3,6-dihydro-2,5-di-(p-methylanilino)-terephthalate).

(b.3) If the procedure followed is as described above under example b 1), but with the difference that 44.7 parts of dimethyl 3,6-dihydro-2,5-di-(p-chloroanilino)-terephthalate are used as the starting material, 32.7 parts of 2,9-dichloroquinacridone are obtained, which corresponds to a yield of 80% of theory (relative to dimethyl 3,6-dihydro-2,5-di-(p-chloranilino)-terephthalate).

We claim:

1. A process for the preparation of linear quinacridones of the formula (1)

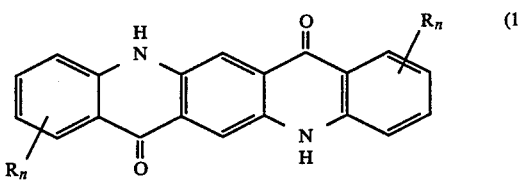

in which R denotes a hydrogen, fluorine, chlorine or bromine atom or a $C_1$–$C_6$-alkyl, $C_1$–$C_3$-alkoxy or phenyl group or a fused benzene ring or a phenylamino or phenoxy group which can be substituted on the aromatic nucleus by fluorine, chlorine or bromine atoms or $C_1$–$C_4$-alkyl groups, and n denotes a number from 0 to 2, it being possible, in the event that n≠0, for the substituents R present on the same benzene ring or on the two benzene rings to be identical or different, by the oxidation of linear 6,13-dihydroquinacridones of the formula (2)

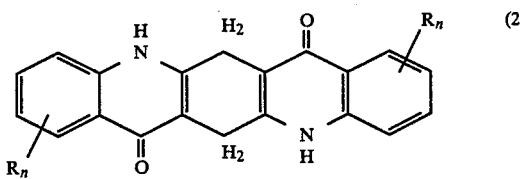

in which R and n have the meanings mentioned above, which comprises heating, at temperatures from about 180° C. to about 280° C., 1 mole of a compound of formula (2) with 1 to 2 moles of iodine in a high-boiling organic solvent which is inert towards the reactants.

2. The process as claimed in claim 1, wherein the oxidation is carried out in a mixture consisting essentially of 76.5% of diphenyl ether and 23.5% of biphenyl, or in nitrobenzene, biphenyl, diphenyl ether, N-methylpyrrolidone or chloronaphthalene as the organic solvent.

3. The process as claimed in claim 1, wherein the hydrogen iodide formed in the course of the oxidation is distilled over during the reaction and absorbed in dilute aqueous alkali metal hydroxide solution, and the iodine is recovered from the aqueous alkaline solution by adding an oxidizing agent and is used again as the oxidizing agent.

4. The process as claimed in claim 1, wherein the hydrogen iodide formed in the course of the oxidation is distilled over during the reaction and absorbed in dilute aqueous alkali metal hydroxide solution, and the iodine is recovered from the aqueous alkaline solution by an oxidizing agent in the presence of an inert solvent which is suitable for use as the reaction medium, the iodine-containing organic solvent is dried, the concentration of iodine is adjusted to the desired value and the iodine-containing solvent is reused.

5. The process as claimed in claim 1, wherein the 6,13-dihydroquinacridone of the said formula (2) is initially taken in a boiling organic solvent, and a solution of iodine in the same solvent is added dropwise.

6. The process as claimed in claim 1, wherein the 6,13-dihydroquinacridone of the said formula (2) is initially taken in a boiling organic solvent, and a solution of iodine in the same solvent is added dropwise, and wherein the γ-crystal phase of unsubstituted quinacridone is obtained when the α-crystal phase of unsubstituted 6,13-dihydroquinacridone is used and a mixture of diphenyl ether and biphenyl is used as the solvent.

7. The process as claimed in claim 1, wherein iodine is added to 6,13-dihydroquinacridone of the said formula (2) at a low temperature, and the mixture is then heated at the boiling point in the organic solvent.

8. The process as claimed in claim 1, wherein iodine is added to 6,13-dihydroquinacridone of the said formula (2) at a low temperature, and the mixture is then heated at the boiling point in the organic solvent, and wherein the β-crystal phase of unsubstituted quinacridone is obtained when the α-crystal phase of unsubstituted 6,13-dihydroquinacridone is used and a mixture of diphenyl ether and biphenyl is used as the solvent.

9. The process as claimed in claim 1, wherein the starting compound employed is a linear 6,13-dihydroquinacridone of the said formula (2) in the form in which it is produced in suspension, without intermediate isolation, after the cyclization, in one of the inert organic solvents mentioned, of a 3,6-dihydro-2,5-diarylaminoterephthalic acid ester of the formula

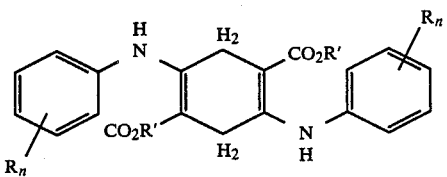

in which R and n have the meanings mentioned in claim 1 and R' denotes a $C_1$–$C_4$-alkyl group.

10. The process as claimed in claim 1, wherein the high-boiling solvent has a boiling point in the range of about 180° to about 280° C.

11. The process as claimed in claim 10, wherein the compound of said formula (2) is in suspension in said solvent when said compound is heated with iodine to a temperature of about 180° to about 280° C.

* * * * *